United States Patent [19]

Kawahara et al.

[11] Patent Number: 5,068,586
[45] Date of Patent: Nov. 26, 1991

[54] STEEPING MOTOR DRIVING APPARATUS

[75] Inventors: Masafumi Kawahara, Nara, Japan; George A. Bowman, Vernon Hills; Joseph B. Matthews, Grayslake, both of Ill.

[73] Assignees: Sharp Kabushiki Kaisha, Osaka, Japan; Baxter Int'l. Inc., Deerfield, Ill.

[21] Appl. No.: 541,953

[22] Filed: Jun. 22, 1990

[30] Foreign Application Priority Data

Jun. 28, 1989 [JP] Japan .................................. 1-165640

[51] Int. Cl.⁵ .............................................. H02P 8/00
[52] U.S. Cl. ...................................... 318/696; 318/685
[58] Field of Search ................................ 318/696, 685

[56] References Cited

U.S. PATENT DOCUMENTS

| | | |
|---|---|---|
| 3,746,959 | 7/1975 | Kobayashi et al. . |
| 3,750,000 | 7/1973 | Bruckner et al. . |
| 3,826,966 | 7/1974 | Nagasaka et al. . |
| 4,015,419 | 4/1977 | Morokawa et al. . |
| 4,024,447 | 5/1977 | Epstein . |
| 4,107,595 | 8/1978 | Campe . |
| 4,140,955 | 2/1979 | Drabing ................ 318/696 |
| 4,254,491 | 3/1981 | Haub et al. . |
| 4,361,410 | 11/1982 | Nakajima et al. . |
| 4,380,722 | 4/1983 | Oltendorf . |
| 4,381,481 | 4/1983 | Kuppers et al. . |
| 4,420,717 | 12/1983 | Wallace et al. . |
| 4,467,256 | 8/1984 | Antognini et al. . |
| 4,468,602 | 8/1984 | Antognini et al. . |
| 4,471,283 | 9/1984 | Presley . |
| 4,574,228 | 3/1986 | Blue et al. . |
| 4,587,473 | 5/1986 | Turvey . |
| 4,599,545 | 7/1986 | Moriki et al. . |
| 4,600,868 | 7/1986 | Bryant . |
| 4,642,544 | 2/1987 | Furumura et al. ............ 318/696 |
| 4,647,829 | 3/1987 | Giguere et al. . |
| 4,707,650 | 11/1987 | Bose . |
| 4,751,445 | 6/1988 | Sakai . |
| 4,757,245 | 7/1988 | Ayers et al. . |
| 4,760,320 | 7/1988 | Tsugita . |
| 4,772,840 | 9/1988 | Taghezout . |

FOREIGN PATENT DOCUMENTS 0127346 12/1984 European Pat. Off. .
0247338 12/1987 European Pat. Off. .
3302209 7/1984 Fed. Rep. of Germany .

Primary Examiner—William M. Shoop, Jr.
Assistant Examiner—Saul M. Bergmann

[57] ABSTRACT

A stepping motor driving apparatus includes a stepping motor and a pulse output circuit for outputting drive pulses for driving the stepping motor. A pulse generator generates further pulses which not only have frequency higher than that of the drive pulses but are capable of a variable duty factor at the frequency of the further pulses. A gate circuit receives the drive pulses from the pulse output circuit and the further pulses from the pulse generator so as to output the further pulses of the pulse generator during excitation of the drive pulses such that the stepping motor is driven by the further pulses outputted from the gate circuit.

17 Claims, 4 Drawing Sheets

STEEPING MOTOR DRIVING APPARATUS

BACKGROUND OF THE INVENTION

The present invention relates to a stepping motor driving apparatus which is suitably applicable to, for example, a liquid infusion pump used in the medical field.

Generally, a liquid infusion pump is used for feeding liquid under pressure from an upstream supply bag through a delivery tube to a downstream infusion cannula. The pump is driven by a stepping motor and a series of eccentric cams are mounted on a rotational shaft of the stepping motor. A finger is provided around a corresponding one of the eccentric cams so as to depress the delivery tube such that the liquid is fed under pressure.

FIG. 1 shows an arrangement of such a known liquid infusion pump. The known liquid infusion pump includes a pump head 1, a four-phase stepping motor 2 for driving the pump head 1 and a control unit 3 for outputting drive pulses to the stepping motor 2 and for controlling various portions of the known liquid infusion pump. Although not specifically shown, the pump head 1 depresses a delivery tube provided between a supply bag and an infusion cannula so as to feed liquid under pressure. Meanwhile, the control unit 3 is formed of a microcomputer.

The known liquid infusion pump further includes a key input portion 4 operable for adjusting the quantity of the liquid fed under pressure, etc., a display unit 5 for displaying pressure of the liquid, etc., an alarm indicator 6 for giving an alarm when pressure of the liquid is abnormal, etc. and a power source 7 for supplying electric power to the various portions of the known liquid infusion pump.

FIGS. 2(a) to 2(d) show wave forms of drive pulses supplied from the control unit 3 to excitation coils of the phases of the stepping motor 2, respectively. The stepping motor 2 is rotated through sequential excitation of the excitation coils.

In the known liquid infusion pump, a necessary quantity of the liquid is fed under pressure by maintaining the number of revolutions of the stepping motor 2 at a predetermined value. However, for example, in the case where torque of the stepping motor 2 is more than adequate for a given load owing to such factors as hardness of the delivery tube, drive current more than necessary is caused to flow through the stepping motor 2, thereby resulting in large power consumption.

SUMMARY OF THE INVENTION

Accordingly, an essential object of the present invention is to provide, with a view to eliminating the above described drawbacks of the conventional stepping motor driving apparatuses, a stepping motor driving apparatus in which power consumption of a stepping motor is reduced while the number of revolutions of the stepping motor is maintained at a predetermined value.

In order to accomplish this object of the present invention, a stepping motor driving apparatus according to the present invention includes a stepping motor and a pulse output circuit for outputting drive pulses for driving said stepping motor and comprises: a pulse generator for generating further pulses which not only have a frequency higher than that of the drive pulses but are capable of changing duty ratio at the frequency of the further pulses; and a gate circuit which receives the drive pulses from said pulse output circuit and the further pulses from said pulse generator so as to output the further pulses of said pulse generator during excitation of the drive pulses such that said stepping motor is driven by the further pulses outputted from said gate circuit.

By the above described arrangement of the stepping motor driving apparatus of the present invention, the conventional drive pulses for driving the stepping motor and the further pulses which not only have the frequency higher than that of the drive pulses but are capable of changing duty ratio at the frequency of the further pulses are inputted to the gate circuit and the stepping motor is driven by the further pulses outputted from the gate circuit during excitation of the drive pulses. Therefore, since the coils of the stepping motor are not excited when the level of the further pulses stands at zero, power consumption of the stepping motor can be reduced. Accordingly, power consumption of the stepping motor can be lessened while the number of revolutions of the stepping motor is maintained at a value corresponding to the drive pulses.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the accompanying drawings.

DETAILED DESCRIPTION OF THE INVENTION

Figure 3:
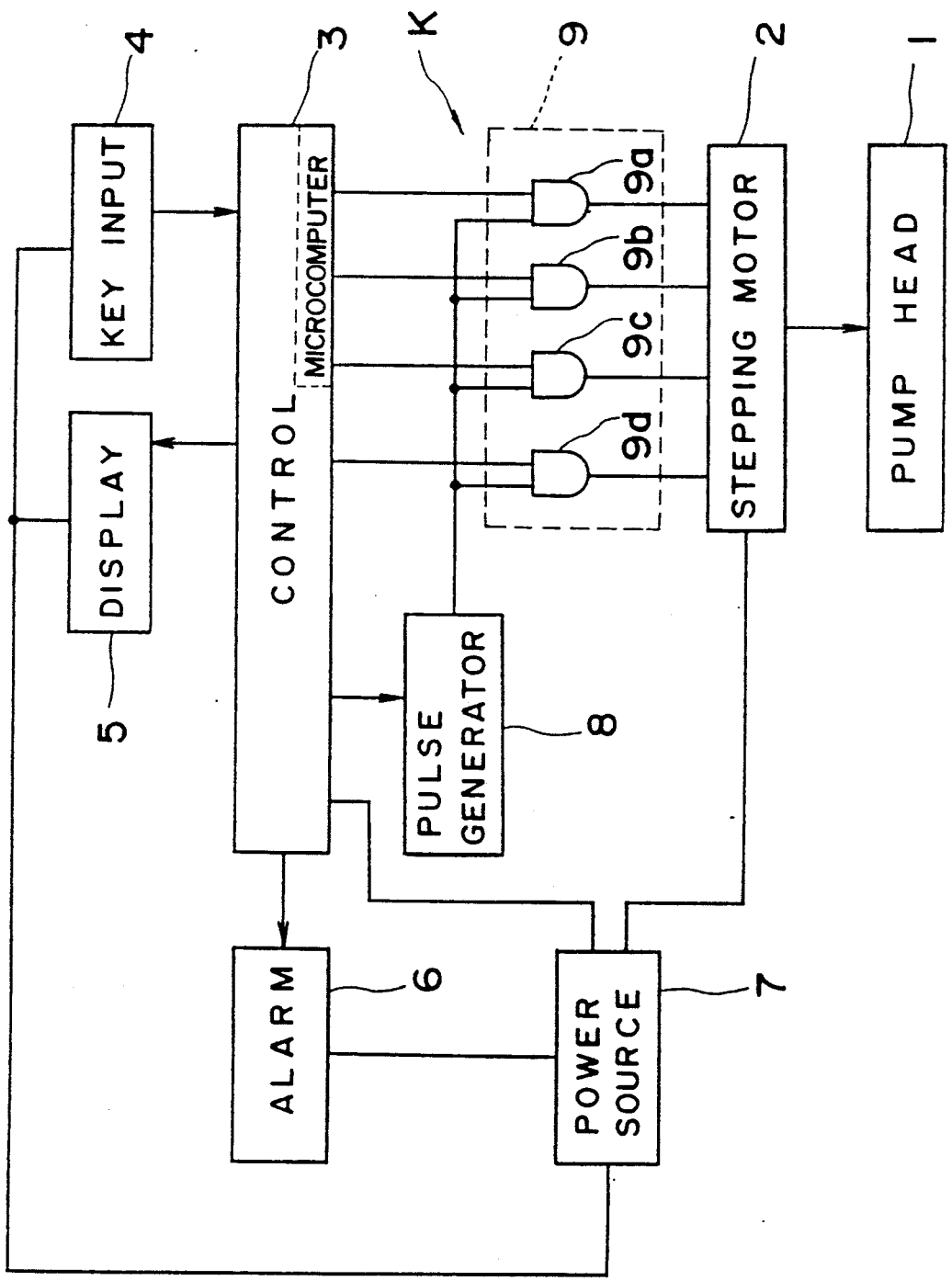
FIG. 3 is a block diagram of a stepping motor driving apparatus according to one embodiment of the present invention.

Referring now to the drawings, there is shown in FIG. 3, a stepping motor driving apparatus K according to one embodiment of the present invention. The apparatus K includes a pump head 1, a four-phase stepping motor 2 for driving the pump head 1 and a control unit 3 for outputting drive pulses for driving the stepping motor 2 and for controlling various portions of the apparatus K. Although not specifically shown, the pump head 1 is provided for depressing a delivery tube provided between a supply bag and an infusion cannula so as to feed liquid under pressure. The control unit 3 includes a microcomputer.

Figure 1:
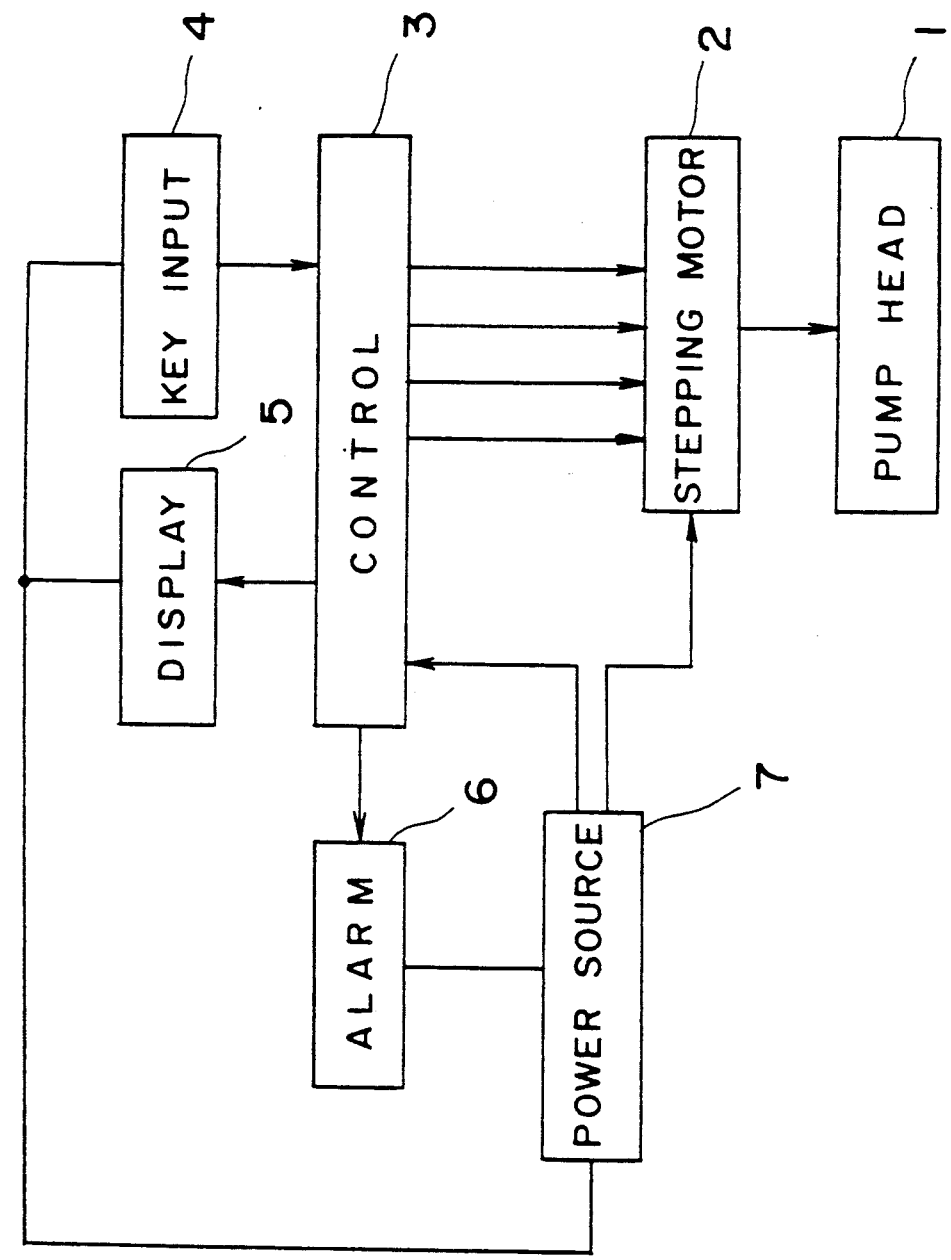
FIG. 1 is a block diagram of a prior art liquid infusion pump (already referred to)
Figure 2:
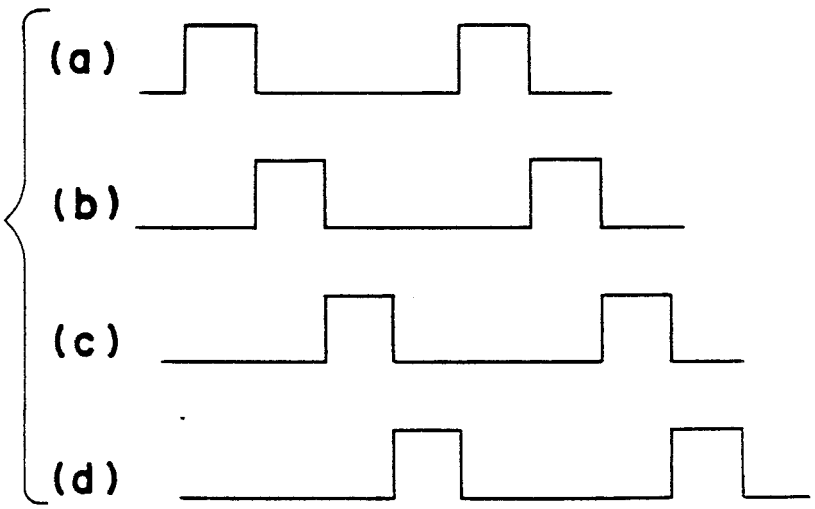
FIGS. 2(a) to 2(d) are views showing wave forms of drive pulses in the prior art liquid infusion pump of FIG. 1 (already referred to)

Furthermore, the apparatus K includes a key input portion 4 operable for adjusting quantity of the liquid fed under pressure, etc., a display unit 5 for displaying pressure of the liquid, etc., an alarm indicator 6 for giving an alarm when pressure of the liquid is abnormal, etc. and a power source 7 for supplying electric power to the various portions of the apparatus K. The above described construction of the apparatus K is fundamentally the same as that of the prior art apparatus of FIG. 1.

Moreover, in order to reduce drive current of the stepping motor 2, the apparatus K includes a pulse generator 8 and a gate circuit 9. The pulse generator 8 is provided for generating further pulses which not only have a frequency higher than that of the drive pulses but are capable of a variable duty factor at the frequency of the further pulses. Meanwhile, in response to the drive pulses from the control unit 3 and the further pulses from the pulse generator 8, the gate circuit 9 outputs the further pulses of the pulse generator 8 during excitation of the drive pulses such that the stepping motor 2 is driven by the further pulses outputted from the gate circuit 9.

The gate circuit 9 is constituted by four AND gates 9a to 9d corresponding to respective excitation coils of the four phases of the stepping motor 2. The further pulses having a frequency higher than that of the drive pulses are, in common, supplied from the pulse generator 8 to one input terminal of each of the AND gates 9a to 9d. Meanwhile, the drive pulses are supplied from the control unit 3 to the other input terminal of each of the AND gates 9a to 9d.

Figure 4:
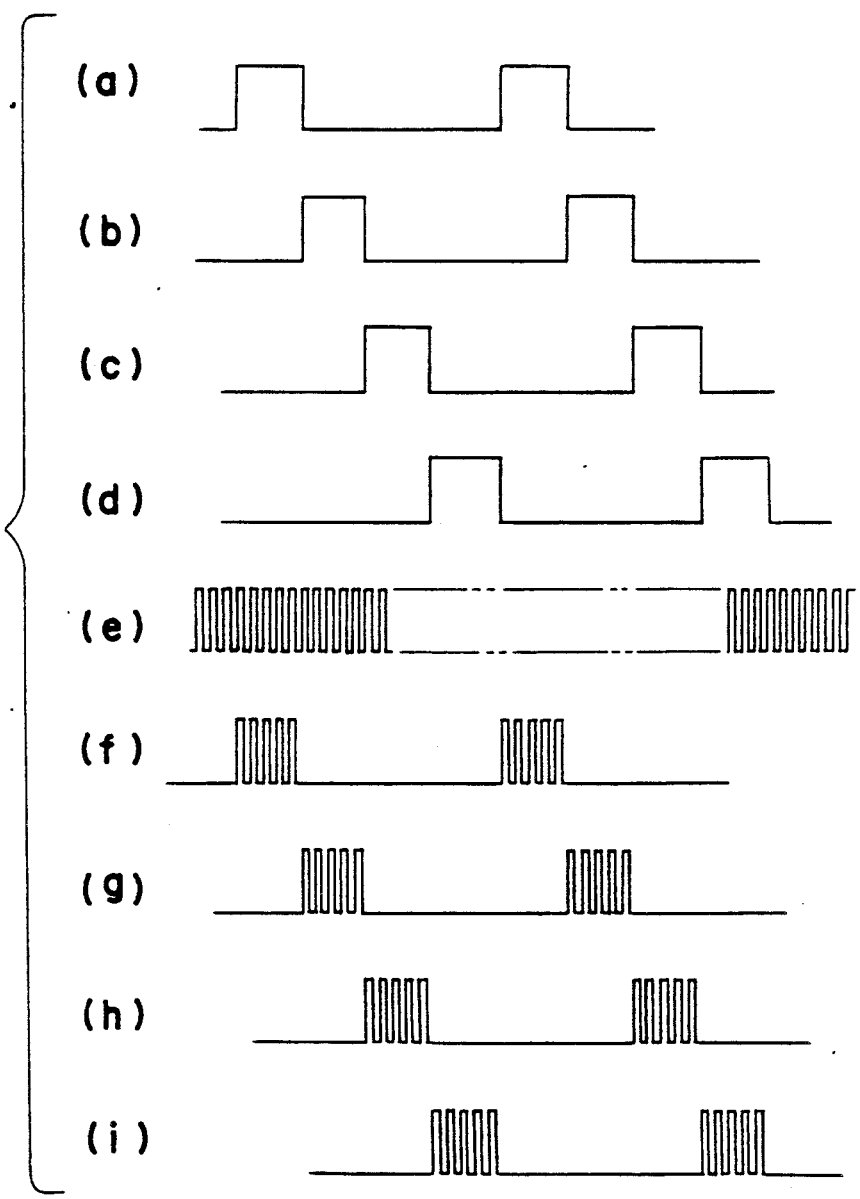
FIGS. 4(a) to 4(i) are views showing wave forms of signals in the stepping motor driving apparatus of FIG. 3.

FIGS. 4(a) to 4(i) show wave forms of signals in the apparatus K. FIGS. 4(a) to 4(d) show wave forms of the conventional drive pulses outputted from the control unit 3 acting as a pulse output circuit. FIG. 4(e) shows the further pulses outputted by the pulse generator 8, while FIGS. 4(f) to 4(i) show the pulses outputted from the AND gates 9a to 9d of the gate circuit 9, respectively. In this embodiment, during excitation of the drive pulses shown rn FIGS. 4(a) to 4(d), namely while the drive pulses of FIGS. 4(a) to 4(d) are at high level, the further pulses of the pulse generator 8 are outputted from the AND gates 9a to 9d as shown in FIGS. 4(f) to 4(i), respectively so as to drive the stepping motor 2.

Accordingly, in this embodiment, the conventional excitatory duration is divided into repeated excitatory and nonexcitatory durations by the further pulses having the frequency higher than that of the drive pulses, thereby resulting in reduction of power consumption of the stepping motor. Namely, in the case where torque of the stepping motor is more than adequate for a given load, it becomes possible to reduce power consumption of the stepping motor while the number of revolutions of the stepping motor is maintained at a hitherto used value.

Meanwhile, in this embodiment, in the case where torque of the stepping motor is not adequate for a given load, the key input portion 4 is operated so as to supply a control signal to the pulse generator 8 from the control unit 3 such that a high-level signal is outputted by the pulse generator 8 at all times. Thus, in this case, the stepping motor 2 is driven by the drive pulses from the control unit 3 in the same manner as the conventional stepping motor driving apparatus.

In the above described embodiment, the further pulses outputted from the pulse generator 8 have a single frequency. However, it can also be so arranged that frequency of the further pulses outputted from the pulse generator 8 is controlled such that drive current of the stepping motor 2 can be controlled more closely.

As is clear from the foregoing description, in the stepping motor driving apparatus of the present invention, both the conventional drive pulses for driving the stepping motor and the further pulses which not only have the frequency higher than that of the drive pulses but are capable of available duty factor at the frequency of the further pulses are inputted to the gate circuit such that the stepping motor is driven by a combination of the pulses outputted from the gate circuit during excitation of the drive pulses. Accordingly, in accordance with the present invention, power consumption can be reduced while the number of revolutions of the stepping motor is maintained at the value corresponding to the drive pulses.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A stepping motor driving apparatus for driving a stepping motor having a plurality of excitation coils and subject to varying load at a desired speed comprising:
   a pulse output circuit for outputting drive pulses at a drive pulse frequency for driving said stepping motor;
   a pulse generator for generating further pulses having a frequency higher than the drive pulse frequency;
   gating means receiving the drive pulses from said pulse output circuit and the further pulses from said pulse generator, for selectively modulating said drive pulses with said further pulses to produce modulated drive pulses and supplying said modulated drive pulses to said excitation coils only when said modulated drive pulses produce a toreque sufficient to drive the load at a desired speed, said modulation of sai drive pulses by said gating means reducing the power consumed by said stepping motor;
   said gating means directly supplying only said drive pulses without modulation by said further pulses to said excitation coils when said modulated drive pulses do not produce a torque sufficient to drive the load at the desired speed.

2. A stepping motor driving apparatus as claimed in claim 1, wherein said stepping motor is a four-phase motor having four excitation coils and said gate circuit includes four AND gates, each associated with an excitation coil.

3. A stepping motor driving apparatus as claimed in claim 1, wherein said pulse output circuit is formed by a microcomputer.

4. A stepping motor driving apparatus as claimed in claim 2, wherein said pulse output circuit is formed by a microcomputer.

5. The apparatus of claim 1 whereins aid gating means modulates said drive pulses by ANDing said drive pulses with said further pulses.

6. The apparatus of claim 1 wherein said modulated drive pulses are normally supplied said stepping motor by said gating means.

7. The apparatus of claim 1 wherein said pulse output circuit sequentially generates said drive pulses for each of said excitation coils.

8. The apparatus of claim 7 wherein said gating means sequentially supplies said modulated drive pulses to said excitation coils.

9. The apparatus of claim 7 wherein said gating means sequentially supplies said modulated drive pulses to said excitation coils.

10. The apparatus of claim 1 wherein said pulse generator varies the duty factor of said further pulses.

11. A method of driving a stepping motor having a plurality of excitation coils and subject to a varying load comprising:
   (a) generating drive pulses to be sequentially supplied to the excitation coils of said stepping motor at a drive pulse frequency;
   (b) generating a modulation frequency signal having a frequency substantially higher in frequency than said drive pulse frequency;
   (c) selectively modulating said drive pulses with said modulation frequency signal to produce modulated drive pulses and supplying said modulatord drive pulses to said excitation coils only when said modulated drive pulses produce a torque sufficient to drive the load at a desired speed, said step of modulating said drive pulses reducing the power consumed by said stepping motor; and
   (d) directly supplying only said drive pulses to said excitation coils of said stepping motor when said modulated drive pulses do not produce a torque sufficient to drive the load at the desired speed, thereby generating torque sufficient to drive said stepping motor at the desired speed.

12. The method of claim 11 wherein said step of modulating modulates said drive pulses by ANDing said drive pulses with the modulation frequency signal.

13. The method of claim 11 wherein said step of modulating and supplying is normally used to drive said stepping motor.

14. The method of claim 11 wherein said step of generating said drive pulses sequentially generates drive pulses for each of said excitation coils.

15. The method of claim 14 wherien said step of modulating sequentially supplies said modulated drive pulses to said plurality of excitation coils.

16. The method of claim 14 wherein said step of directly supplying sequentially supplies said drive pulses to said plurality of excitation coils.

17. The method of claim 11 wherein said step (b) of generating modulating varies the duty factor of said modulation frequency signal.

* * * * *